(12) United States Patent
Chikaoka

(10) Patent No.: US 9,865,188 B2
(45) Date of Patent: Jan. 9, 2018

(54) IMAGE DISPLAY DEVICE

(71) Applicant: Funai Electric Co., Ltd., Osaka (JP)

(72) Inventor: Atsuhiko Chikaoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 180 days.

(21) Appl. No.: 15/048,093

(22) Filed: Feb. 19, 2016

(65) Prior Publication Data

US 2016/0247431 A1 Aug. 25, 2016

Related U.S. Application Data

(63) Continuation of application No. 13/883,035, filed on May 2, 2013, now Pat. No. 9,298,013.

(30) Foreign Application Priority Data

Nov. 8, 2010 (JP) .................................. 2010-249653
Nov. 1, 2011 (WO) ................... PCT/JP2011/006117

(51) Int. Cl.
*G03B 21/14* (2006.01)
*G09G 3/02* (2006.01)
(Continued)

(52) U.S. Cl.
CPC .............. *G09G 3/02* (2013.01); *G02B 27/48* (2013.01); *H04N 9/3129* (2013.01); *H04N 9/3135* (2013.01)

(58) Field of Classification Search
CPC . G02B 27/48; F09G 3/02; H04N 9/31; H04N 5/74; H01S 5/04; G09G 3/34; G09G 3/20; G03B 21/20; G03B 21/14
See application file for complete search history.

(56) References Cited

U.S. PATENT DOCUMENTS

2009/0067459 A1 3/2009 Mizuuchi et al.
2009/0189923 A1 7/2009 Hirano et al.
(Continued)

FOREIGN PATENT DOCUMENTS

JP 2001-189520 A 7/2001
JP 2008-309935 A 12/2008
(Continued)

OTHER PUBLICATIONS

International Search Report, issued from PCT/JP2011/006117 with an international filed of Nov. 1, 2011, dated Jan. 10, 2012.

*Primary Examiner* — Sultan Chowdhury
*Assistant Examiner* — Danell L Owens
(74) *Attorney, Agent, or Firm* — Baker & Hostetler LLP

(57) ABSTRACT

The image display device resolves inconsistency in the brightness of the image while effectively reducing local speckle noise that remains due to the laser scanning of which the scanning speed fluctuates. A waveform pattern (PT2) that includes an on period and an off period within the pixel displaying period (T2) is selected for the center pixel (P512). A waveform pattern (PT1) that includes an on period and an off period within the pixel displaying period (T1) that is longer than the pixel displaying period (T2) is selected for the side pixel (P1) or (P1023) that is scanned at a scanning speed slower than that for the center pixel (P512). Here, the on period in the waveform pattern (PT1) is segmented more than the on period in the waveform pattern (PT1), and the time ratio of the on period accounting for the waveform pattern (PT1) is smaller than the time ratio of the on period accounting for the waveform pattern (PT2).

20 Claims, 12 Drawing Sheets

(51) Int. Cl.
*G02B 27/48* (2006.01)
*H04N 9/31* (2006.01)

(56) References Cited

U.S. PATENT DOCUMENTS

| | | |
|---|---|---|
| 2009/0284190 A1 | 11/2009 | Matsubara et al. |
| 2010/0265473 A1 | 10/2010 | Yamashita et al. |
| 2011/0012874 A1 | 1/2011 | Kurozuka |
| 2012/0044279 A1 | 2/2012 | Uchino |

FOREIGN PATENT DOCUMENTS

| | | |
|---|---|---|
| JP | 2009-175428 A | 8/2009 |
| JP | 2011-221061 A | 11/2011 |
| WO | 2007-099847 A1 | 9/2007 |
| WO | 2009-069659 A1 | 6/2009 |
| WO | 2010-125866 A1 | 11/2010 |
| WO | 2012-063430 A1 | 5/2012 |

Even-numbered frame

Odd-numbered frame

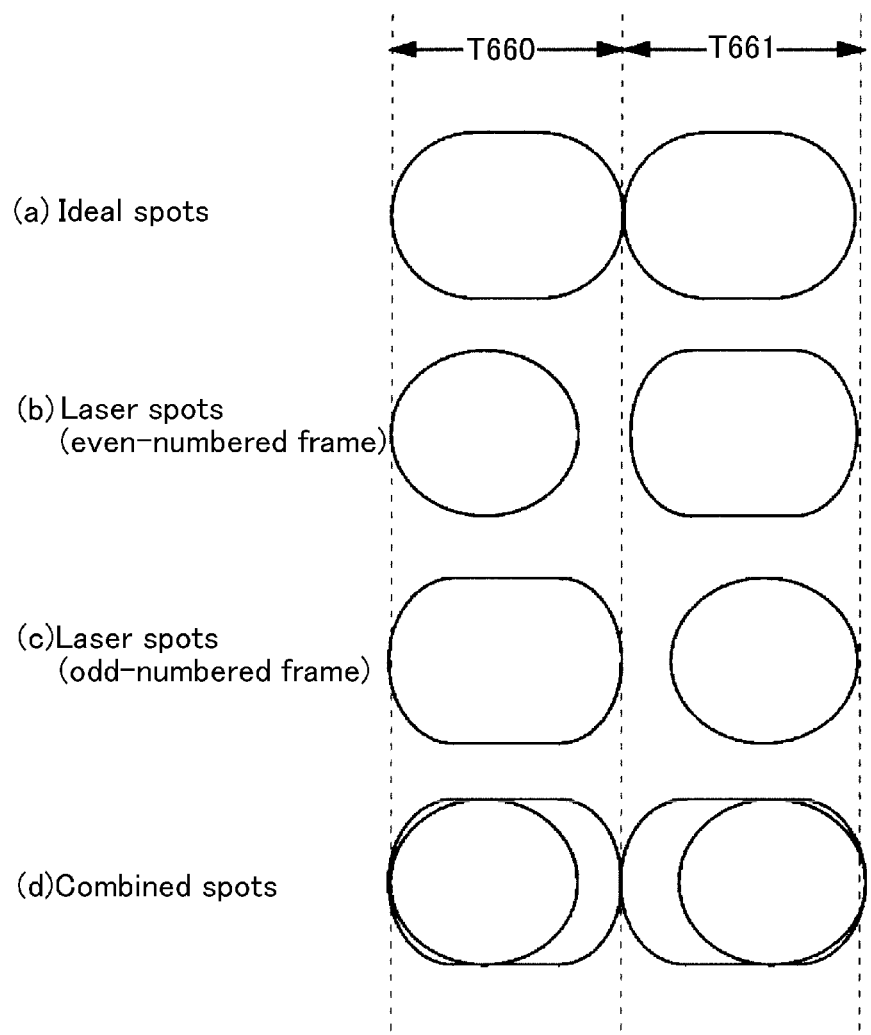

IMAGE DISPLAY DEVICE

TECHNICAL FIELD

The present invention relates to an image display device for displaying an image on a projection surface through scanning of a laser beam.

BACKGROUND ART

Patent Document 1 discloses a laser projector for displaying an image on a projection surface by reflecting a laser beam emitted from a laser source from a scanning mirror so as to be projected onto this projection surface. The scanning mirror is freely displaced in the directions along two axes, and the mirror is oscillated with a resonance frequency particular to the mirror. In this laser projector, microscopic flickers, which are referred to as speckle noise, become a problem caused by the coherence particular to the laser beam. In order to reduce speckle noise, various techniques have been proposed, and as one of them, Patent Document 2 discloses a technique for using relaxation oscillations of the laser source. In this technique, a rectangular waveform pattern where on and off alternate is used to drive the laser source. The laser source starts relaxation oscillations at the time when off is switched to on, and the relaxation oscillations are maintained in the on period afterwards. This on period is set to be equal to or shorter than the time during which the relaxation oscillations converge. Accordingly, the output level of the laser source fluctuates unstably throughout the on period, and thus, the coherence of the laser beam lowers and the speckle noise is reduced.

In the laser scanning driven by the resonance frequency as in Patent Document 1, the speed at which the laser spot projected onto the projection surface moves in the scanning direction, that is to say, the scanning speed, is not constant, and the scanning speed is different depending on the image region on the projection surface. These characteristics of speed originate from the periodic fluctuations of the shifting angle per unit hour (angular speed) of the scanning mirror. The scanning mirror is driven by a drive current that corresponds to the resonance frequency, and the shifting angle thereof changes in a sine waveform along the time axis. The angular speed of the mirror is fastest when the shifting angle is minimum and slowest when the shifting angle is maximum. Accordingly, the scanning speed that links to the angular speed of the mirror is also fastest in the center area of the image that corresponds to the minimum shifting angle and slowest in the side areas (vicinity of the left and right ends) of the image that corresponds to the maximum shifting angle. Accordingly, the scanning speed that links to the angular speed of the mirror is fastest in the center area of the image that corresponds to the minimum shifting angle and slowest in the side areas (vicinity of left and right ends) of the image that correspond to the maximum shifting angle. Due to the difference in the scanning speed, the center area, which is scanned the fastest, tends to appear dark and the side areas, which are scanned the slowest, tend to appear bright even in the case where the same gradation is displayed. This is because the brightness perceived by the user depends on the integral value gained by integrating the strength of the output of the laser beam by time. In order to solve this inconsistency of brightness, Patent Document 3 discloses an image display device for enhancing the display brightness in the center area while lowering the display brightness in the side areas by correcting the driving signal for the laser diode, that is to say, the level of the current depending on the display location in the image.

PRIOR ART DOCUMENTS

Patent Documents

Patent Document 1: Japanese Unexamined Patent Publication 2009-175428
Patent Document 2: Japanese Unexamined Patent Publication 2001-189520
Patent Document 3: Japanese Unexamined Patent Publication 2008-309935

SUMMARY OF THE INVENTION

Problem to be Solved by the Invention

In the case where a waveform pattern as in Patent Document 2 is uniformly applied to the laser scanning accompanying a fluctuation in the scanning speed as in Patent Document 1, such a problem is caused that sufficient effects of reducing speckle noise cannot be gained in the regions of pixels where the scanning speed is slow (pixels having a long display period). This is because in the case where the number of times of switching from "Off" to "On" in the waveform pattern is constant, in other words, the number of times of relaxation oscillations is constant, the longer the display period of one pixel is, the lower the relative ratio of the relaxation oscillation time accounting for this period is. As a result, speckle noise easily remains locally in the side regions of the image irrespective of the measures being taken against the speckle noise.

The present invention is provided in view of the above-described situations, and an object thereof is to resolve the inconsistency in the brightness in the image while effectively reducing local speckle noise that remains due to laser scanning that accompanies the fluctuations in the scanning speed.

Means for Solving Problem

In order to solve the above-described problem, the present invention provides an image display device having a laser control unit, a laser source and a scanning mirror, which displays an image on a projection surface through the scanning of a laser beam that accompanies fluctuations in the scanning speed. The laser control unit selects a first waveform pattern that includes a first on period and a first off period within a period for displaying a first pixel. The laser control unit selects a second waveform pattern that includes a second on period and a second off period within a period for displaying a second pixel that is longer than the period for displaying a first pixel, where the second pixel is scanned at a scanning speed slower than that for the first pixel. Here, the second on period in the second waveform pattern is segmented more than the first on period in the first waveform pattern. In addition, the time ratio of the second on period accounting for the second waveform pattern is smaller than the time ratio of the first on period accounting for the first waveform pattern. The laser source emits a laser beam at a current level corresponding to the display gradation of the first pixel during the first on period in the first waveform pattern selected by the laser control unit, and emits a laser beam at a current level corresponding to the display gradation of the second pixel during the second on period in the second waveform pattern selected by the laser control unit, and at the same time, allows a current level to be set to the level at its own bias current or lower irrelevant of the display gradations in the first off period and the second off period. The scanning mirror from which a laser beam that pertains to the first pixel and the second pixel and that has been emitted from the laser source is reflected in accordance with its shifting angle so as to be projected onto the projection surface following a predetermined scanning order.

In the present invention, it is preferable for the total time of the second on period in the second waveform pattern to be approximately the same as the total time of the first on period in the first waveform pattern.

In the present invention, it is preferable for the first off period to be short to such an extent that the laser spot projected onto the projection surface in the first on period located directly before the first off period and the laser spot in the first on period located directly after the first off period are formed so as to connect. In addition, it is preferable for the second off period to be short to such an extent that the laser spot in the second on period located directly before the second off period and the laser spot in the second on period located directly after the second off period are formed so as to connect.

In the present invention, it is preferable for the laser control unit to generate the first waveform pattern and the second waveform pattern on the basis of a reference clock that is out of sync with the period for displaying a first pixel and the period for displaying a second pixel. Here, the first on period in the first waveform pattern is set within a period during which the period for displaying a first pixel and the period for displaying a pixel defined by the reference clock overlap. In addition, the second on period in the second waveform pattern is set within a period during which the period for displaying a second pixel and the period for displaying a pixel defined by the reference clock overlap.

In the present invention, the laser control unit may alternately select a number of different sub-patterns that have been prepared in advance as the first waveform pattern for the first pixel in predetermined intervals, and may alternately select a number of different sub-patterns that have been prepared in advance as the second waveform pattern for the second pixel in predetermined intervals.

In the present invention, it is preferable for the scanning mirror to displace its shifting angle in a sine waveform along the time axis, and as a result, the second pixel is scanned at a scanning speed that is slower than that for the first pixel.

Effects of the Invention

According to the present invention, the laser source is relaxation oscillated using the first and second waveform patterns that include an on and an off period. At this time, the on period for the second pixel of which the period for displaying the pixel is set longer in order to compensate for the difference in the scanning speed is segmented more than that for the first pixel of which the period for displaying the pixel is set shorter so that a greater number of relaxation oscillations are generated. As a result, a reduction in the time ratio of the relaxation oscillations accompanying the elongation of the period for displaying the pixel can be suppressed. As a result, speckle noise can be effectively reduced not only in the region of a pixel of which the period for displaying the pixel is short (a pixel where the scanning speed is fast), but also in the region of a pixel of which the period for displaying the pixel is long (a pixel where the scanning speed is slow). In addition, the on duty in the second waveform pattern can be made smaller than that in the first waveform pattern so that the brightness of the second pixel, where the time integral of the output intensity of the laser beam tends to be great due to the scanning speed being slow, can be suppressed, where the on duty is the time ratio of the on period accounting for the waveform pattern. Thus, the system is made to perform in such a way as to make uniform the time integral of the output intensity of the laser beam so that it is possible to solve the inconsistency in the brightness of the image.

BRIEF DESCRIPTION OF THE DRAWINGS

FIG. 14 is a diagram for illustrating pixel forms formed of the waveform patterns in FIGS. 13A and 13B.

PREFERRED EMBODIMENTS OF THE INVENTION

Figure 1:
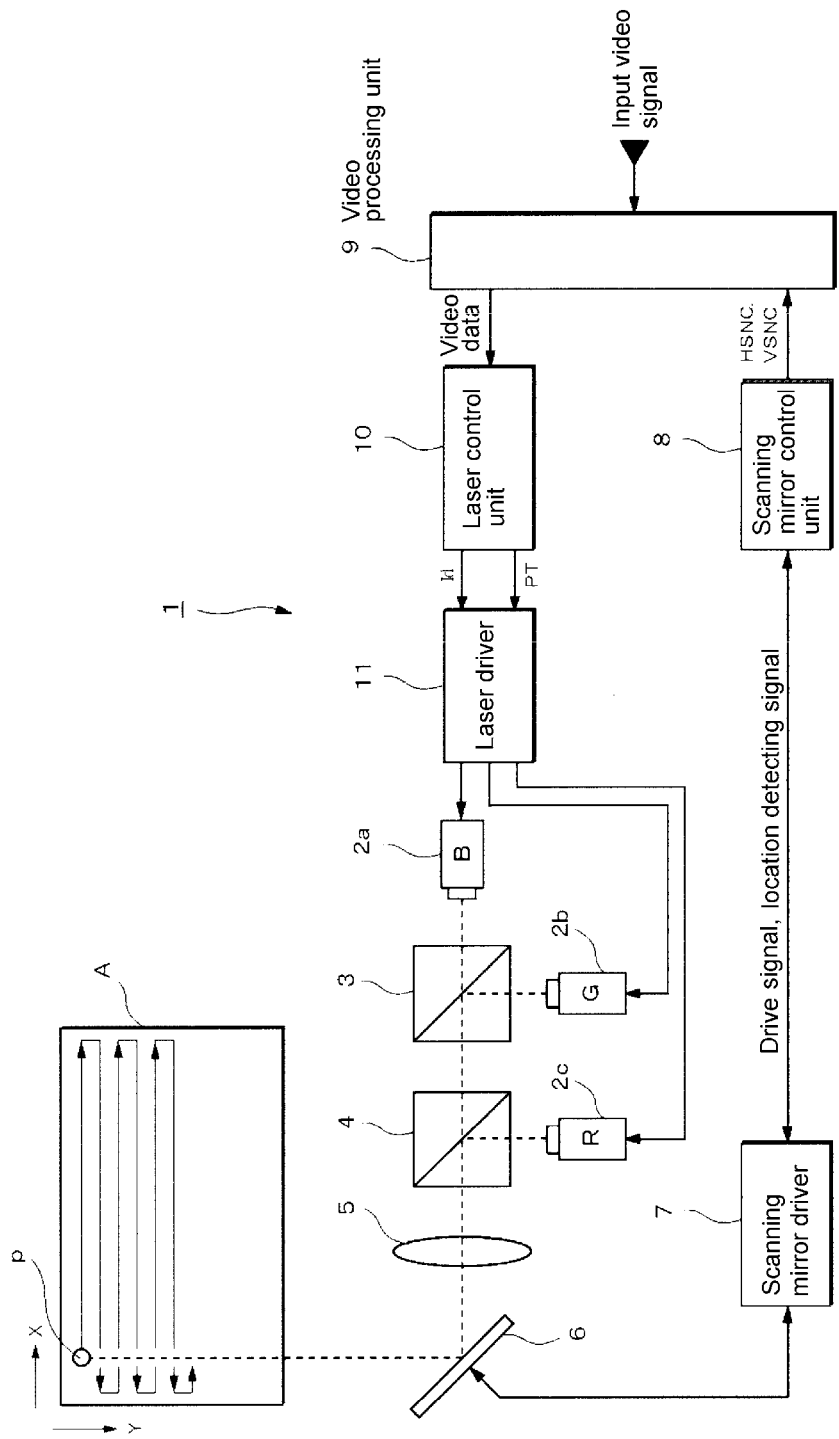
FIG. 1 is a block diagram showing the structure of a laser projector.

FIG. 1 is a block diagram showing the structure of the laser projector according to the present embodiment. This laser projector 1 is formed mainly of laser sources 2a to 2c, various types of optical elements 3 to 5, a scanning mirror 6 and various types of driving/control units 7 to 11. The laser projector 1 combines laser beams for the red, blue and green components, and then projects them on a projection surface A, such as a screen or a wall, so that a color image corresponding to a video signal is displayed on the projection surface A. The laser projector 1 uses laser beams having extremely high directivity, and therefore has an excellent advantage where it is unnecessary to adjust the focal point in accordance with the distance to the projection surface A.

The laser sources 2a to 2c are driven independent of each other by a drive current that is individually supplied from the laser driver 11. As a result, laser beams having a certain wavelength, such as the blue component (B) from the laser source 2a, the green component (G) from the laser source 2b and the red component (R) from the laser source 2c, are emitted at the output level in accordance with the gradation for the display. The dye clock mirrors 3 and 4 allow a laser beam only of a certain wavelength to transmit and reflect the other laser beams so that the laser beams of the respective color components emitted from the laser sources 2a to 2c are combined. Typically, laser beams of a blue component and a green component emitted from the laser sources 2a and 2b are combined in the dye clock mirror 3 from the upstream of the light path before being emitted to the dye clock mirror 4 from the downstream of the light path. The thus-emitted combined light is further combined with a laser beam of a red component emitted from the laser source 2c in the dye clock mirror 4 before being emitted as a targeted beam of a final color. The thus-emitted color beam enters into the scanning mirror 6 through the lens 5.

The scanning mirror 6 reflects the color beam that has entered into it in accordance with its shifting angle (phase) and projects it onto the projection surface A. This scanning mirror 6 has a two-dimensional freedom corresponding to the horizontal direction X and the vertical direction Y on the projection surface A so that an image is formed on the projection surface A through the successive line scanning corresponding to its two-dimensional displacement. In this successive line scanning, the laser spot p moves in one direction along a certain horizontal line on the projection surface A, and the laser spot p returns in the opposite direction along the horizontal line directly beneath the above horizontal line, which is repeated so that the scanning continues within one frame. There are several types of scanning mirrors 6 depending on its way of being driven, and any of them may be used. A type using an MEMS (Micro Electro Mechanical Systems) technology is easily available, and thus is advantageous in order to miniaturize the entirety of the device, reduce power consumption, and increase the processing speed.

Figure 2:
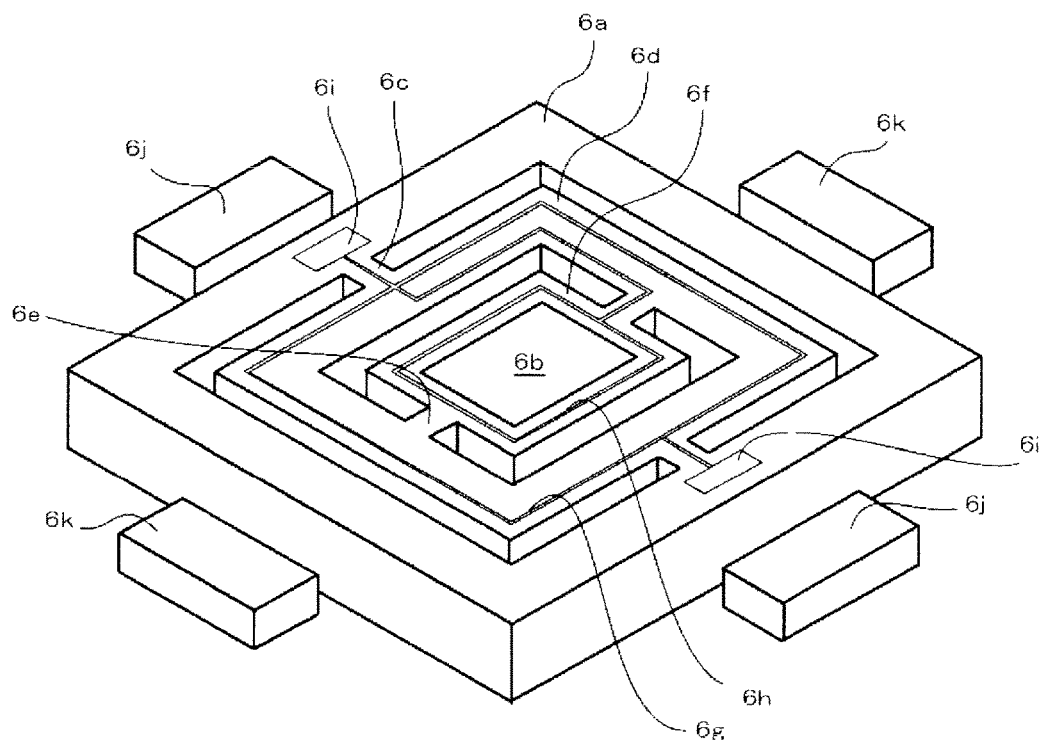
FIG. 2 is a perspective diagram showing the appearance of a scanning mirror.

FIG. 2 is a perspective diagram showing the appearance of the scanning mirror 6. An outer frame 6d in rectangular frame shape is attached to the inside of the substrate 6a in rectangular frame shape through an outer rotational axis 6c so as to jostle freely. In addition, an inner frame 6f in rectangular shape is attached to the inside of this outer frame 6d through an inner rotational axis 6e so as to jostle freely, and a mirror 6b is provided at the center of this inner frame 6f. The direction in which a beam is reflected from the mirror 6b attached to the substrate 6a through the inner and outer frames 6d and 6f is uniquely designated on the basis of the amount of rotation (shifting angle θh) of the inner frame 6f around the inner rotational axis 6e and the amount of rotation (shifting angle θv) of the outer frame 6d around the outer rotational axis 6c that is orthogonal to the inner rotational axis 6e. Meanwhile, an outer coil 6g is provided to the outer frame 6d so as to surround the mirror 6b, and an inner coil 6h is provided to the inner frame 6f so as to surround the mirror 6b. These coils 6g and 6h are respectively connected to a pair of electrodes 6i in such a state as being electrically separated from each other so that individual drive currents are supplied to the respective coils 6g and 6h through these electrodes 6i. In addition, two pairs of permanent magnets 6j and 6k are provided so that the directions in which the respective magnets face in each pair are orthogonal to each other. One pair of permanent magnets 6j is provided so that the N pole and the S pole face each other in the direction of the outer rotational axis 6c, and the other pair of permanent magnets 6k is provided so that the N pole and the S pole face each other in the direction of the inner rotational axis 6e.

The principle of the operation of the mirror 6b for scanning in the case where the mirror 6b is driven electromagnetically can be outlined as follows. First, in the case where a drive current for horizontal scanning is supplied through the electrodes 6i, the inner coil 6h through which this drive current flows and the pair of permanent magnets 6j generate an electromagnetic force between them, which causes the mirror 6b to jostle around the inner rotational axis 6e. In addition, during one horizontal scan line period, which corresponds to ½ of this jostling period, the laser beam for one line in the horizontal direction that has been chronologically emitted from the laser sources 2a to 2c is successively reflected so that an image of one horizontal line is projected onto and displayed on the projection surface A (horizontal scanning). In contrast, in the case where a drive current for vertical scanning is supplied through the electrodes 6i, the outer coil 6g through which this drive current flows and the other pair of permanent magnets 6k generate an electromagnetic force between them, which causes the mirror 6b to jostle around the outer rotational axis 6c. In addition, during one vertical scan period, which correspond to ½ of this jostling period, reflection of a laser beam for one horizontal line is repeated by the number of horizontal lines so that an image of one frame is projected onto and displayed on the projection surface A (vertical scanning).

Figure 3:
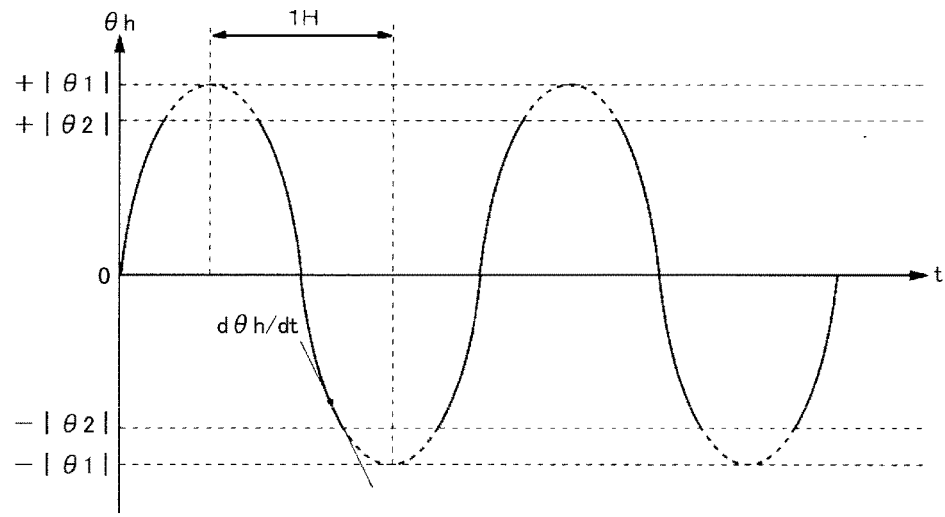
FIG. 3 is a graph for illustrating the shifting angle of the mirror for horizontal scanning.

FIG. 3 is a graph for illustrating the shifting angle θh of the mirror 6b for horizontal scanning. In the present embodiment, the mirror 6b is driven with a resonant frequency for the horizontal scanning, and thus, the shifting angle θh is successively changed. Here, the resonant frequency is the frequency that makes the current value that is required to jostle the mirror 6b the lowest, and thus has a value specific to the mirror that is uniquely determined by the size of the mirror 6b, the density and the hardness of the material, and the like. When the mirror 6b is oscillated with the resonant frequency, a large mirror amplitude (θh=|θ1|) can be gained with a small current value. Here, the mirror 6b may be oscillated with a frequency other than the resonant frequency, though a large current value is required as compared to the case driven with the resonant frequency.

In this case, the displacement of the shifting angle θh along the time axis is in a sine form, and the ½ periods thereof corresponds to one horizontal scan line period (1H). The angular speed dθh/dt of the mirror 6b is the fastest at θh=0, gradually becomes slower as |θ1| increases, and becomes 0 at |θh|=θ1 (maximum shifting angle). Here, not the phase range that includes the maximum shifting angles (−|θh|≤θ≤+|θh|), but the phase range (−|θ2|≤θ≤+|θ2|) that is narrower than this is used for the effective range actually used for the image display. This is because the inclusion of the maximum shifting angle |θ1| at which the angular speed dθh/dt becomes 0 makes the pixel size (pixel width in the horizontal direction) on the projection surface A that is defined by the integral of the display period for one pixel and the scanning speed theoretically 0, and thus, the same size as other pixels cannot be secured.

Meanwhile, the shifting angle θv of the mirror 6b in the vertical scanning is controlled through DC driving instead of the above-described resonant frequency driving. Accordingly, the shifting angle θv changes step-by-step in accordance with the level of the driving current and stops moving at the shifting angle θv corresponding to this level. The switching of the level of the driving current is repeated by the number of horizontal lines during one vertical scan line period, and as a result, the phase range of the shifting angle θv that corresponds to the height of the image to be displayed (number of horizontal lines) is secured. In this case, unlike in the case of horizontal scanning, the displacement of the shifting angle θv along the time axis is linear, and the angular speed dθv/dt thereof is constant. Here, there is a type of electromagnetic driving scanning mirror where both the horizontal scanning and the vertical scanning are carried out through the resonant frequency driving, and this type may be used as the scanning mirror 6.

Together with this, the scanning mirror driver 7 detects the location of the mirror 6b in the scanning mirror 6 (shifting angle θh, θv). The thus-detected location information is sent to the scanning mirror control unit 8 as a location detecting signal. In order to detect the location of the mirror 6b, twisting sensors are provided to the rotational axis 6c for connecting the substrate 6a and the outer frame 6d and to the rotational axis 6e for connecting the inner and outer frames 6d and 6f, respectively, so that the twisting angles of these rotational axes 6c and 6e may be detected individually by the twisting sensors. In addition, a light receiving element (photodiode) may be provided in proximity to the mirror 6b so that the location of the reflected light that is unique to the shifting angle of the mirror 6b can be detected by the light receiving element.

The scanning mirror control unit 8 controls the scanning mirror 6 so that the laser beam that has entered into the scanning mirror 6 scans a predetermined image region with a predetermined frequency. This control is carried out when the scanning mirror control unit 8 outputs a driving signal to the scanning mirror driver 7. In addition, the scanning mirror control unit 8 generates a horizontal sync signal HSNC and a vertical sync signal VSNC on the basis of the location detection signal from the scanning mirror driver 7 and outputs these signals to the video processing unit 9. It is necessary for the timing according to which laser beams are emitted from the laser sources 2a to 2c to be in sync with the phase control of the scanning mirror 6, and horizontal and vertical sync signals HSNC and VSNC are used in order to achieve this sync. That is to say, in the present laser projector 1, the scanning mirror 6 is mainly driven, and the laser sources 2a to 2c are driven in such a manner as to follow and be in sync with the drive of the scanning mirror 6 on the basis of the horizontal and vertical sync signals HSNC and VSNC that have been generated inside.

The video processing unit 9 writes the input video signal (video data) that has been supplied from an external device to a frame buffer, not shown, as required in accordance with the timing defined by the sync signal supplied from the external device. In addition, the video processing unit 9 sequentially reads out the video data that has been stored in the frame buffer in accordance with the timing defined by the horizontal and vertical sync signals HSNC and VSNC supplied from the scanning mirror control unit 8 and transfers this video data to the laser control unit 10.

The laser control unit 10 determines a driving current Id (current level) relating to each pixel and a waveform pattern PT to be applied to this on the basis of the video data that has been sequentially transferred from the video processing unit 9. The laser sources 2a to 2c are individually controlled and driven through the laser driver 11 on the basis of the driving current Id and the waveform pattern PT that have been set for each color component. In the present embodiment, a number of waveform patterns PT are prepared so that an appropriate one is selectively applied depending on the location of the pixel on the image plane. In addition, the laser control unit 10 carries out feedback control on the driving current on the basis of the amount of the emitted laser beam that has been detected by the photodetector (not shown) so that the amount of the emitted laser beam for each gradation is stable. As a result, it is possible to effectively respond to the fluctuation in the output of the beam even if this fluctuation is caused by an increase in the temperature of the laser sources 2a to 2c.

The laser driver 11 modulates the driving current Id for each color component using the waveform pattern PT that has been outputted from the laser control unit 10 so that the modulated driving current I'd is outputted to the laser sources 2a to 2c individually. As a result, the laser sources 2a to 2c emit a laser beam at the output level in accordance with the gradation for the display following the waveform pattern PT. The final color beam, where the emitted beams for the respective color components are combined, is guided to the scanning mirror 6 of which the location is controlled in sync with the emission of the laser beams, and then is projected onto the projection surface A in the desired pixel locations.

Figure 4:
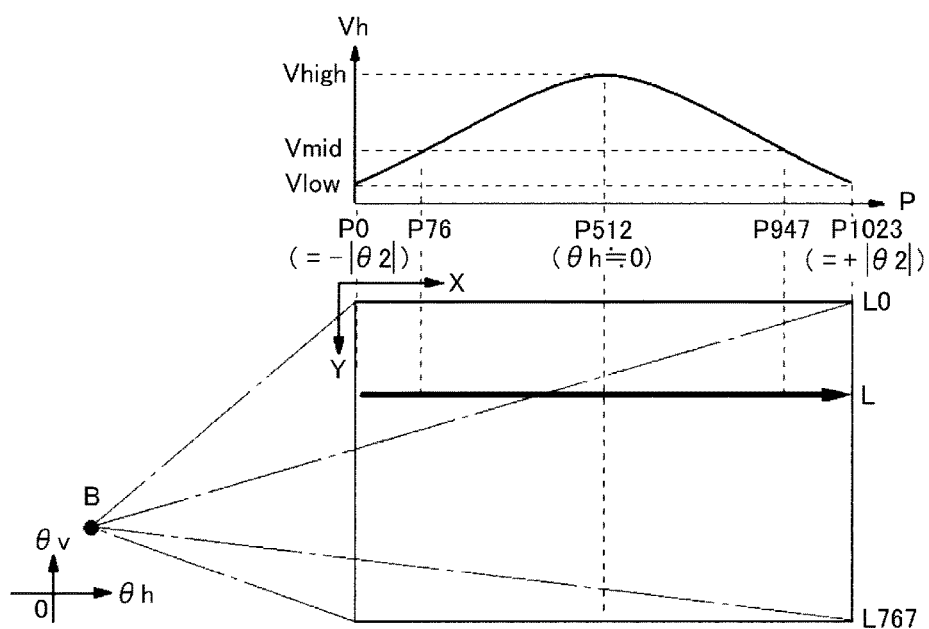
FIG. 4 is a diagram for illustrating the laser scanning for a projection surface.

FIG. 4 is a diagram for illustrating the laser scanning for a projection surface A in FIG. 1. The laser beam emitted from the emission point B on the laser projector 1 is projected onto the projection surface A, and as a result, a laser spot p (see FIG. 1) is formed and displayed at one end (left end, for example) of a certain horizontal line L. This laser spot p moves from left to right, for example, along the horizontal line L in accordance with the displacement of the shifting angle θh of the mirror 6b. Here, the scanning speed Vh of the laser spot p changes in the same manner as the angular speed dθh/dt of the mirror 6b. Typically, in the case where an image is displayed within a range of −|θ2|≤θh≤+|θ2|, the speed is the lowest (Vh=Vlow) at the pixels P0 and P1023 on both sides that correspond to the maximum shifting angles (θh=+/−|θ2|), the speed increases continuously towards the center pixel P512 (Vh=Vmid at pixels P76 and P947, for example), and the speed is the highest (Vh=Vhigh) in the center pixel P512 that corresponds to the minimum shifting angle (θh=0). The characteristics of this scanning speed Vh are symmetrical between left and right relative to the center of the image in the same manner as the angular speed dθv/dt. Here, the speed characteristics are the same for all the lines L0 to L767 aligned in the vertical direction.

Figure 5:
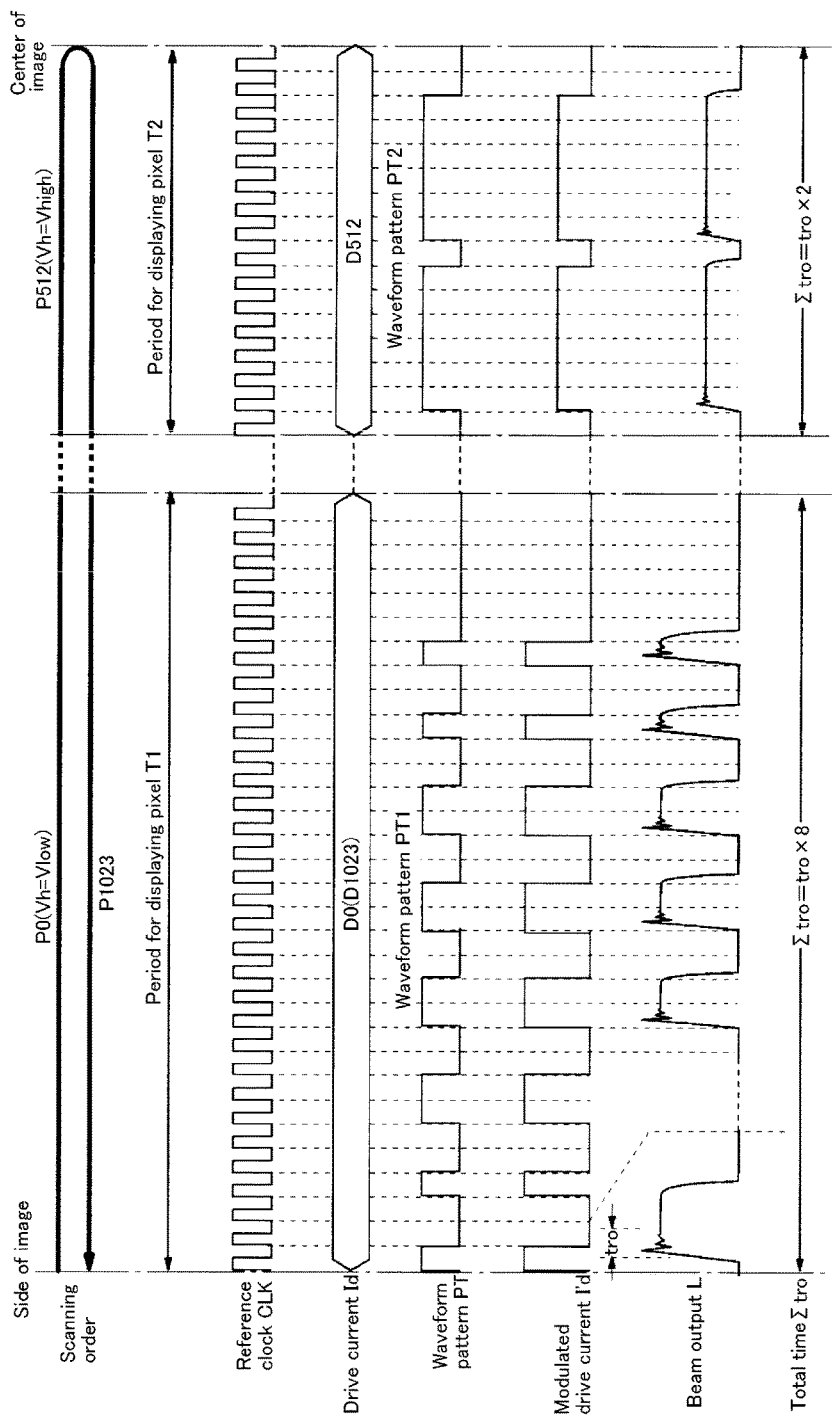
FIG. 5 is a timing chart for the laser controlling/driving system.

FIG. 5 is a timing chart for the laser controlling/driving system. In the following, pixels P0, P512 and P1023 (see FIG. 4) that are scanned in this order along the same horizontal line L are cited as examples to describe the operations of the laser control unit 10 and the laser driver 11 in detail. Here, the pixel displaying periods T1 and T2 shown in FIG. 5 are defined by the dot clock signals that are in sync with the horizontal and vertical sync signals HSNC and VSNC.

Unlike liquid crystal displays where pixels having a physical structure are formed, pixels are optically formed on the laser projector 1 through irradiation with laser beams. In this case, the size of one pixel for the display on the projection surface A (pixel width in the horizontal direction) is determined on the basis of the integral of the pixel display period during which a laser beam for one pixel is kept being irradiated and the scanning speed Vlh of the laser spot p. Examples can be cited, such as Vlow×T1 for the side pixels P0 and P1023 located on the sides of the image, and Vhigh×T2 for the center pixel P512 located at the center of the image. In the case where the scanning speed Vh is different for each pixel, it is necessary to adjust the pixel displaying period to compensate for the difference in the scanning speed Vh so that all the pixels are maintained at a constant size, and theoretically, the pixel displaying term may be set so as to be inversely proportional to the scanning speed Vh. That is to say, when the ratio of the scanning speed is Vlow:Vhigh, the ratio of the pixel displaying period (T1:T2) may be set to 1/Vlow:1/Vhigh so that the pixel size can be made uniform. As a result, the relationship of the pixel displaying period becomes T1>T2, and thus, the pixel displaying period gradually increases as the location shifts from the center pixel P512 towards the side pixel P0 or P1023. Though the pixel display period is set for the pixel unit which is the minimum unit for an image in the present embodiment, the pixel displaying period may be set with an area unit having a resolution that is more coarse than that with the pixel unit, that is to say, covering a number of adjacent pixels, if the same level of precision timewise as with the pixel unit is not required. In the case of an area unit, it is not necessary for the number of pixels in each area to be the same, and the number of pixels may be different for each area in such a manner that a smaller number of pixels are allocated for areas to be made smaller where the change in the scanning speed Vh is greater.

Figure 6:
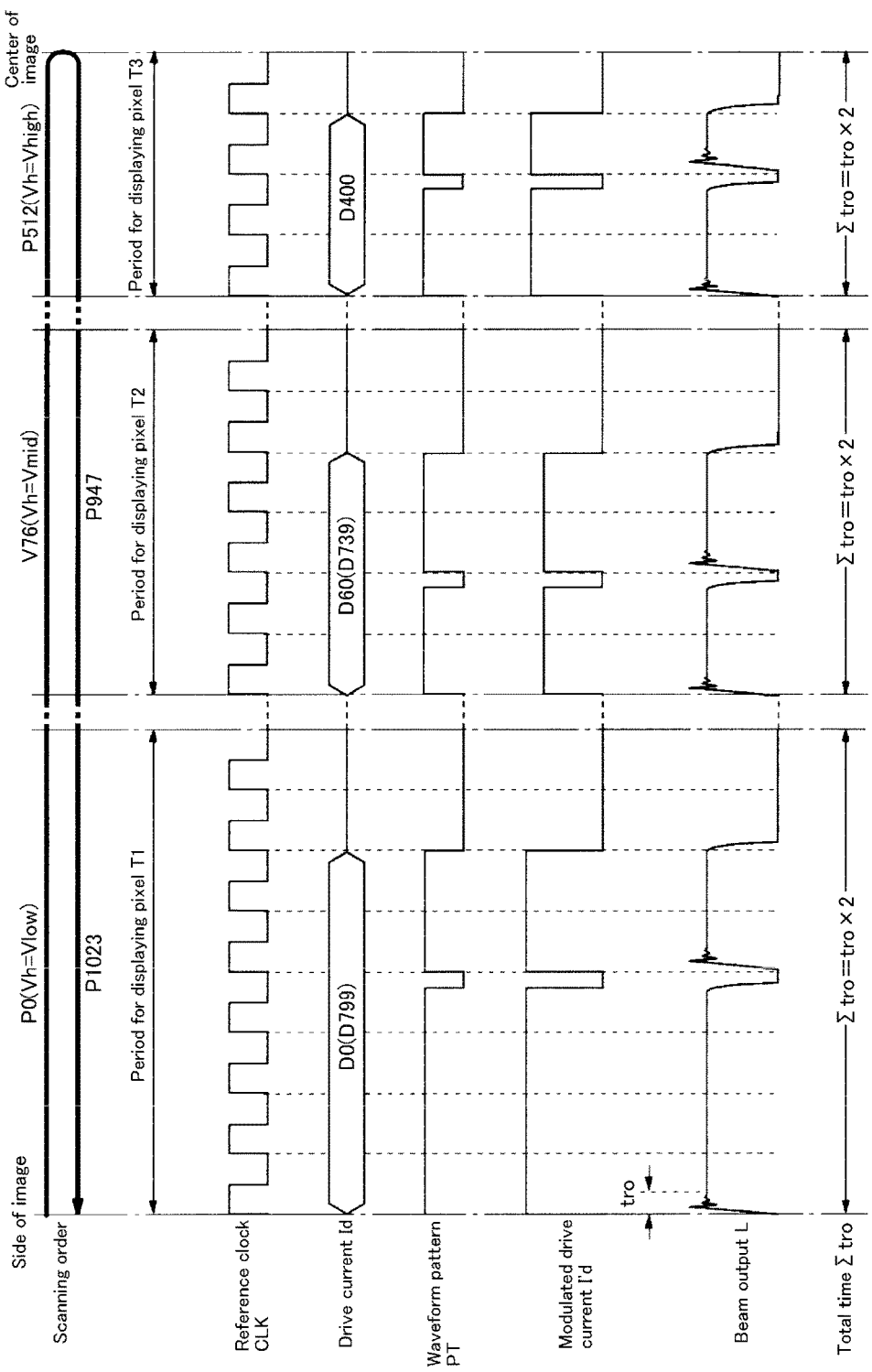
FIG. 6 is a diagram for illustrating a pixel which is not good, formed of laser spots that are not connected.

In order to reduce speckle noise, it is effective to lower the coherence (conversion to incoherence) of the laser beams through relaxation oscillations of the laser sources 2a to 2c, which is described in the above Patent Document 2. In the case where relaxation oscillations of the same number of times or for a constant time are carried out on all the pixels, however, a problem arises that a sufficient effect of noise reduction cannot be gained in regions having pixels where the scanning speed is low (pixels having a long display period). In the comparative example in FIG. 6, for example, the same waveform pattern PT that switches from on to off twice is used for all the pixels. In this case, the laser sources 2a to 2c carry out relaxation oscillations twice as defined by the waveform pattern PT during the respective pixel display periods. As a result of the relaxation oscillations, a laser beam of which the coherence has been lowered is emitted, and therefore, the effects to reduce speckle noise can be gained. When the time during which the relaxation oscillations of the laser sources 2a to 2c start due to the sudden increase in the driving current Id and the relaxation oscillations converge is referred to as relaxation oscillation time tro, the total Σ tro of the relaxation oscillation time tro within the pixel displaying period is a constant value for all the pixels (Σtro=tro×2). In this case, as the pixel displaying period is longer in the order of T3, T2, T1, the timewise ratio of the total time Σtro accounting for the pixel displaying period lowers. This means that in the pixel display period, the ratio of emission of an incoherent laser beam lowers and the ratio of emission of an original coherent laser beam increases. As a result, the effects to reduce noise become weaker as the location shifts towards a side pixel P0 or P1023, and speckle noise locally remains.

In order to reduce the local speckle noise in this manner, as shown in FIG. 5, more relaxation oscillations may be carried out as the scanning speed Vh becomes slower during the pixel displaying period that is set longer as the scanning speed Vh becomes slower. Typically, the reference clock CLK that has been internally generated may be used so that a waveform pattern PT in sync with the reference clock CLK is generated for predetermined units, and the laser sources 2a to 2c may be driven on the basis of this waveform pattern PT. Though it is assumed in the present embodiment that the waveform pattern PT is set with pixel units, the waveform pattern PT may be set with area units that are more coarse than with the pixel units.

Typically, the laser control unit 10 generates waveform patterns PT1, . . . PT2 in accordance with the location of the pixel along the horizontal line L on the basis of the reference clock CLK. The respective waveform patterns PT1, . . . PT2 define the on period and the off period of the laser sources 2a to 2c during the pixel displaying periods T1, . . . T2, and the longer the pixel displaying period T is, the longer the waveform pattern PT is set. During the on period, the driving current Id (current level) is set so as to correspond to the display gradation, and during the off period, the current is set to the current Ioff (for example, 0) that is not higher than the bias current Ith (the value on the border between the LED light emission and the laser oscillation) of the laser sources 2a to 2c irrelevant of the display gradation. The off period between the adjacent on periods during the pixel displaying period T is set in order to initiate the relaxation oscillations in accordance with the timing where off is switched to on, and the length of the period may be appropriately set. In addition, the off period at the end of the pixel displaying period means the preparation for the switching to the first on in the next pixel displaying period in addition to the blanking for suppressing the mixture of colors between adjacent pixels.

For the center pixel P512, for example, 16 periods of the reference clock CLK are set as the shortest pixel displaying period T2, and the waveform pattern PT2 corresponding to this period is set. The waveform pattern PT2 is formed of an on period having the total time of 12 periods and an off period having the total time of 4 periods. Here, during the on period, the 12 periods are not continuous, but divided into two on periods of 6 periods, and an off period of one period intervenes between these. The laser control unit 10 generates a current level Id for each color component corresponding to the display gradation D512 and a waveform pattern PT2 for all the color components during each on period. This waveform pattern PT2 includes at least one on period that has switched from off (two on periods in the present embodiment) in order to generate relaxation oscillations for the laser sources 2a to 2c. The laser driver 11 modulates the driving current Id for each color component using the waveform pattern PT2 outputted from the laser control unit 10 so that the modulated driving current I'd is outputted to the laser sources 2a to 2c. As a result, the laser sources 2a to 2c emit a laser beam at the output level corresponding to the display gradation D400 following the waveform pattern PT2. The final color beam, where the emitted beams for the respective color components are combined, is guided to the scanning mirror 6 of which the location is controlled in sync with the emission of the laser beams, and then is projected onto the projection surface A in the location of the center pixel P512. When the center pixel P512 is displayed, relaxation oscillations are generated twice within the pixel displaying period T2, and the total time Σtro thereof is tro×2. Speckle noise can be effectively reduced in the display region of the center pixel P512 by appropriately setting the number of times of relaxation oscillations.

Meanwhile, 32 periods of the reference clock CLK are set as the longest pixel display period T1 for the side pixel P0 (P1023), for example, and a waveform pattern PT1 corresponding to this period is set. The waveform pattern PT1 is formed of an on period having the total time of 12 periods and an off period having the total time of 12 periods. The on period of the waveform pattern PT1 is divided into 8 on periods having one period or two periods, and thus is segmented more than the above-described waveform pattern PT2. The laser control unit 10 generates the current level IdLc for each color component that corresponds to the display gradation D0 (D1023) during each on period and a waveform pattern PT1 for all the color components. This waveform pattern PT1 has 8 on periods that have switched from off in order to generate relaxation oscillations more than for the center pixel P512. The laser driver 11 modulates the driving current Id for each color component using the waveform pattern PT1 outputted from the laser control unit 10 so that the modulated driving current I'd is outputted to the laser sources 2a to 2c. As a result, the laser sources 2a to 2c emit a laser beam at the output level corresponding to the display gradation D0 (D1023) following the waveform pattern PT1. When the side pixel P0 (P1023) is displayed, relaxation oscillations are generated 8 times within the pixel displaying period T1, which is more than for the center pixel P512. Taking into consideration the fact that the pixel displaying period T1 is longer, the number of times of relaxation oscillations is increased and the total time $\Sigma$tro (=trox8) is made longer at that time so that speckle noise can be effectively reduced in the display region of the side pixel P0 (P1023).

In addition, the fact that the on duty of the waveform pattern PT1, that is to say, the time ratio of the on period accounting for the waveform pattern PT1, is set smaller than that of the waveform pattern PT2 can be cited as another characteristic of the waveform patterns PT1 and PT2. In the example shown in the figure, the on duty of the waveform pattern PT1 is $3/8$ (=12 periods/32 periods) while the on duty of the waveform pattern PT2 is $3/4$ (=12 periods/16 periods), and thus, the above-described relationship is met. The on duty of the waveform pattern gradually becomes smaller as the location shifts from the center pixel P512 towards the side pixel P0 or P1023. The reason why the on duty is changed in this manner is to resolve inconsistencies in the brightness of the image. As described above, the brightness perceived by the user depends on the integral value gained by integrating the output intensity of the laser beam with the time. Accordingly, in the case where the time for irradiating with the beam is constant for all the pixels, the center region where the scanning speed is high tends to be dark and the side regions where the scanning speed is low tend to be bright due to the difference in the scanning speed Vh. In contrast, as in the present embodiment, the difference in the scanning speed Vh can be compensated with the on duty (that is to say, the time for irradiating with the beam per pixel can be made constant) so that the above-described time integral can be made uniform, and thus, it is possible to resolve the inconsistencies in the brightness. In particular, in the case where the total time of the on periods is approximately the same in all the waveform patterns, including the waveform patterns PT1 and PT2, it can be completely resolved theoretically that pixels at the same gradation look to be at different gradations depending on the location.

Figure 7A:
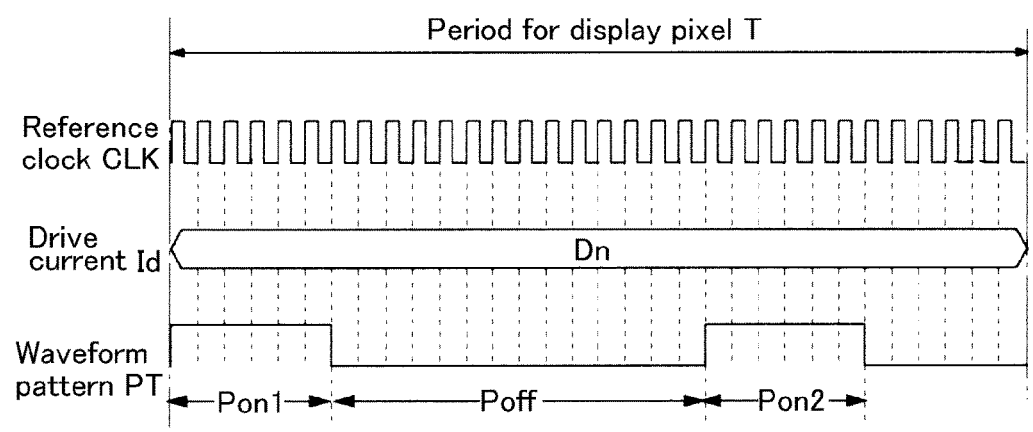
FIG. 7A is a timing chart for the laser controlling/driving system in a comparative example.
Figure 7B:
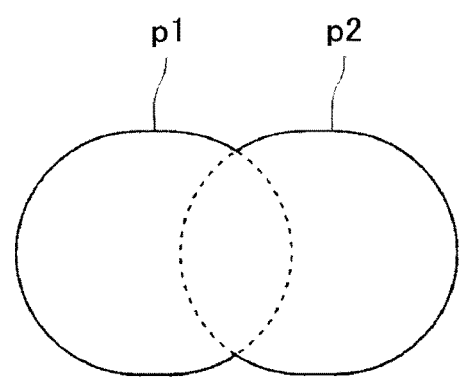
FIG. 7B is a diagram illustrating a distance between laser spots when laser spots are formed according to the timing chart of FIG. 7A.
Figure 8A:
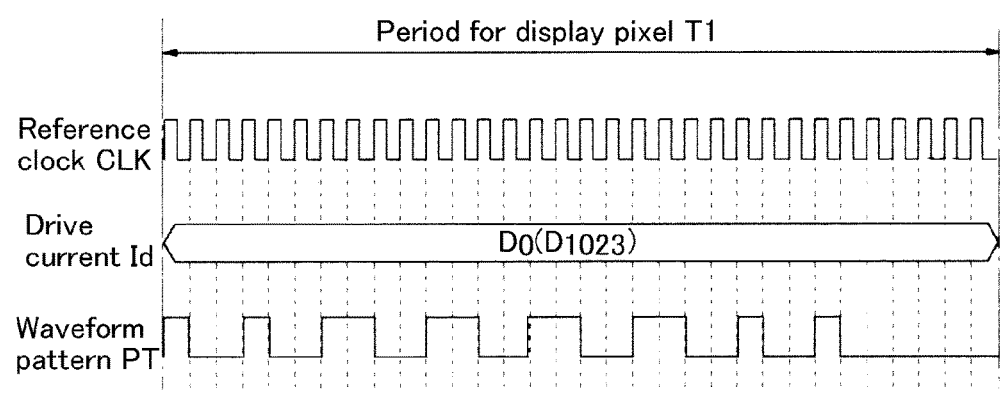
FIG. 8A is a diagram for illustrating a good pixel formed of laser spots that are connected.
Figure 8B:
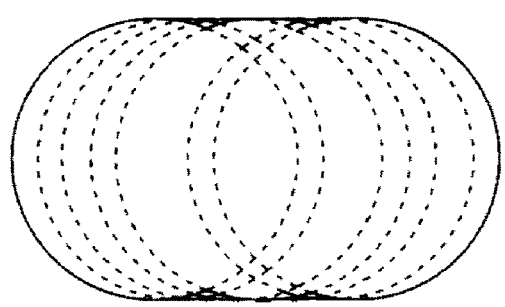
FIG. 8B is a diagram illustrating a close proximity between laser spots when laser spots are formed according to the timing chart of FIG. 8A.

Next, several techniques for improving the form of the pixels by optimizing the waveform pattern PT are proposed. The first technique for improvement relates to the form of the pixels by optimizing the off period. A case is assumed where the off period Poff that intervenes between the front and rear on periods Pon1 and Pon2 is long as in the waveform pattern PT in FIG. 7(a). When the off period of Poff is long, as shown in FIG. 7(b), the laser spot p1 formed during the on period Pon1 and the laser spot p2 formed during the on period Pon2 are at a distance from each other, and thus, the laser spots p1 and p2 discontinue. As a result, the form of the pixel on the projection surface has a defective resolution, which leads to the deterioration of the image quality. Here, the laser spots p1 and p2 are the forms of laser beams formed on the projection surface when the laser beam is projected only during the on period Pon1 or Pon2. In order to prevent this form from becoming defective, the on period may be segmented as in the waveform pattern PT in FIG. 8(a) so that the off period that intervenes between the front and rear on periods can be made as short as possible within the range of the resolution allowed by the reference clock CLK. In the case where the off period is short, the respective laser spots formed during the on periods positioned before and after the off period are in close proximity to each other. As shown in FIG. 8(b), in the case where the off periods are made short to such an extent that the laser spots are formed successively, the form of the pixels projected onto the projection surface has a good resolution, and therefore, it is possible to increase the image quality.

Figure 9:
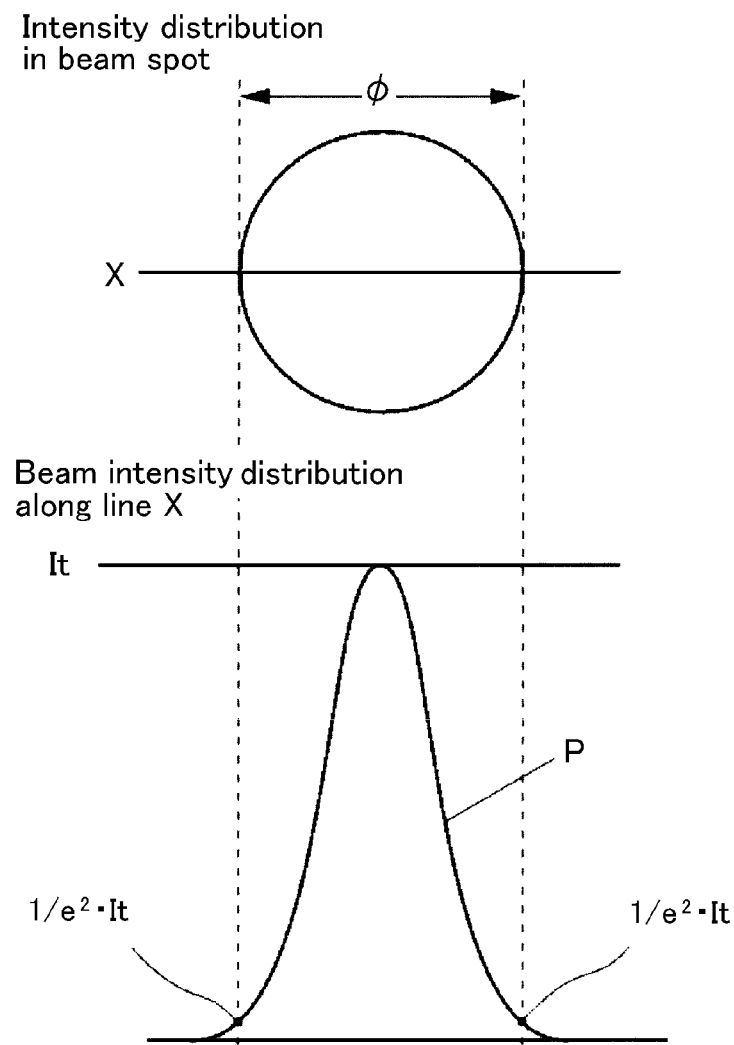
FIG. 9 is a diagram for illustrating the intensity distribution in a laser beam.
Figure 10A:
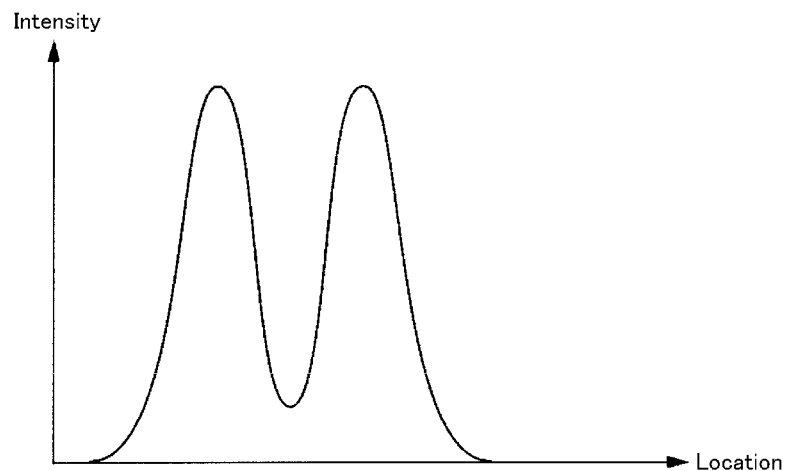
FIG. 10A shows graphs for illustrating the intensity distribution of a beam spot on a projection surface.
Figure 10B:
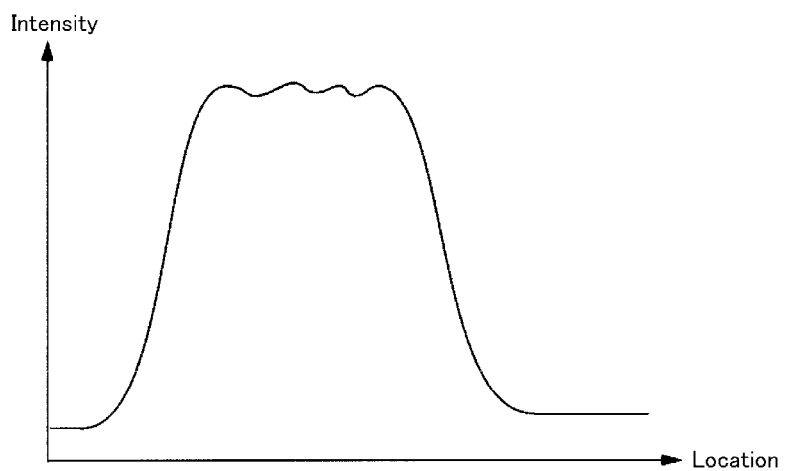
FIG. 10B shows a graph for illustrating the intensity of a beam spot on a projection surface.

In order to make the laser spots adjacent to each other be formed successively, the off period may be set so as to correspond to the moving time (scanning time) for $1/6$ of the spot diameter. As shown in FIG. 9, it is generally known that the distribution of the intensity of the beam spots by the laser sources 2a to 2c becomes a Gaussian distribution. In the case where the off period is secured for the time during which the spot moves $1/2$ of the spot diameter $\varphi$, the distribution of the intensity in the horizontal direction of the pixels formed on the projection surface A becomes that as in FIG. 10(a), and thus, the respective spots appear independent due to the change in the intensity. Meanwhile, in the case where the off period is shorter than this and set to the time during which the spot moves $1/6$ of the spot diameter $\varphi$, the distribution of the intensity in the horizontal direction becomes that as in FIG. 10(b), and thus, the change in the intensity is suppressed as a whole and becomes inconspicuous.

Figure 11:
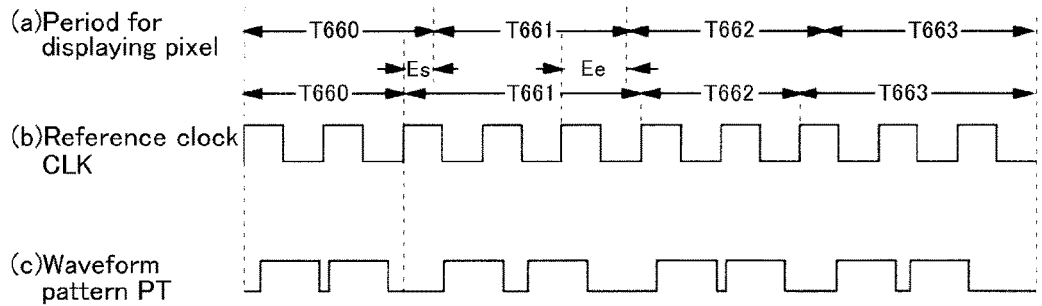
FIG. 11 is a timing chart showing a waveform pattern that optimizes the pixel form.
Figure 12:
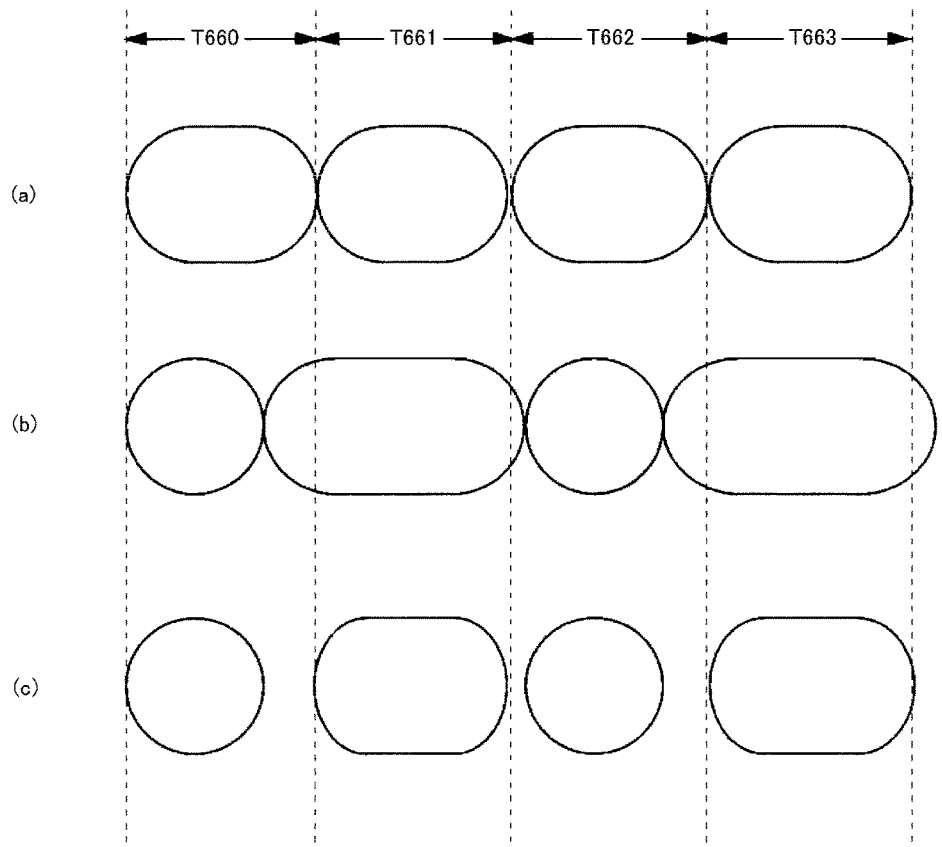
FIG. 12 is a diagram for illustrating pixel forms formed of the waveform pattern in FIG. 11.

The second technique for improvement relates to the inconsistency in the form of the adjacent pixels. In the situation where ideal pixel displaying periods T660 to T663 are defined by the dot clock signal or the like as in FIG. 11(a), a case is assumed where a waveform pattern PT is generated on the basis of the reference clock CLK (see FIG. 11(b)) which is in sync with the dot clock signal. In the case where a waveform pattern PT of which the period completely corresponds to the pixel displaying periods T660 to T663 is generated, as shown in FIG. 12(a), pixels formed on the projection surface have an ideally uniform form. In reality, however, as shown in FIG. 11(b), the waveform pattern PT is generated on the basis of the reference clock CLK, and therefore, there is an inconsistency between the pixel displaying periods T'660 to T'663 that are defined as integer times greater than the period of the reference clock CLK and the ideal pixel displaying periods T660 to T663. As a result, as shown in FIG. 12(b), some pixels become smaller than their original form, by which the adjacent pixels become larger. In order to solve this inconsistency in the form of the pixels, the on periods along the time axis in the waveform pattern may be set so as to be within the period where the ideal pixel displaying period T and the pixel displaying period T' defined by the reference clock CLK overlap. The example in FIG. 11(c) satisfies this condition in all aspects such that the first two on periods in the waveform pattern PT are within the periods where the pixel displaying periods T660 and T'660 overlap, the next two on periods are within the period where the pixel displaying periods T661 and T'661 overlap, the next two on periods are within the period where the pixel displaying periods T662 and T'662 overlap, and the final two on periods are within the period where the pixel displaying periods T663 and T'663 overlap. In this manner, as shown in FIG. 12(*c*), adjacent pixels are formed without trespassing on an ideal pixel displaying period T660 to T663, and therefore, the form of the pixels can be made uniform.

As for a typical technique for this, it is preferable to prepare a number of waveform patterns PT having different numbers of on periods and different locations of the on periods along the time axis in advance so that any of them can be selected in accordance with a table reference method (LUT). In this case, (1) a start error that is the difference in the start time between the pixel displaying periods T and T', (2) a stop error that is the difference in the finishing time between the pixel displaying periods T and T', and (3) the number of reference clocks CLK per pixel can be used as the inputs for the table. The shifting in the locations where the pixels are formed can be reduced by changing the waveform pattern PT in accordance with the above (1) and (2). In addition, the waveform pattern PT can be changed in accordance with the above (3) so that pixels having a good form can be formed, and it is also possible to further reduce the shifting in the locations where pixels are formed.

Figure 13A:
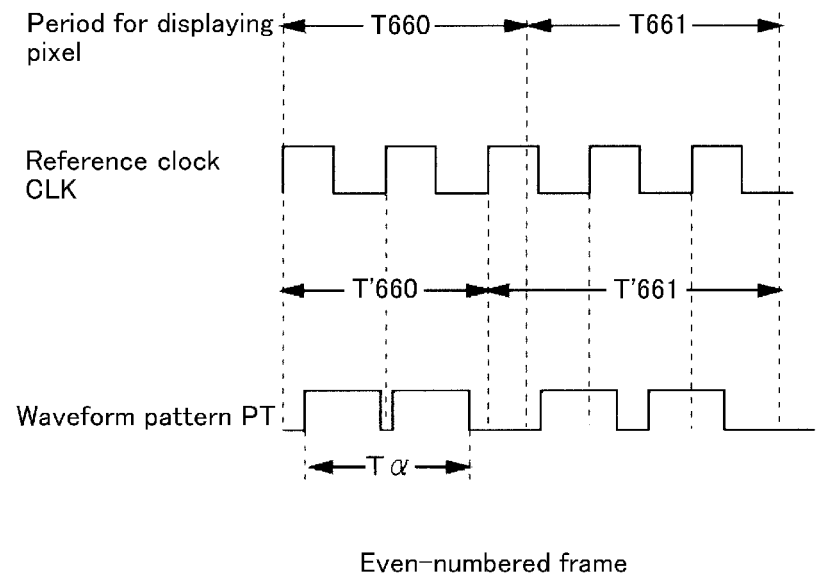
FIG. 13A is a timing chart showing a waveform pattern that can be switched in frame units.
Figure 13B:
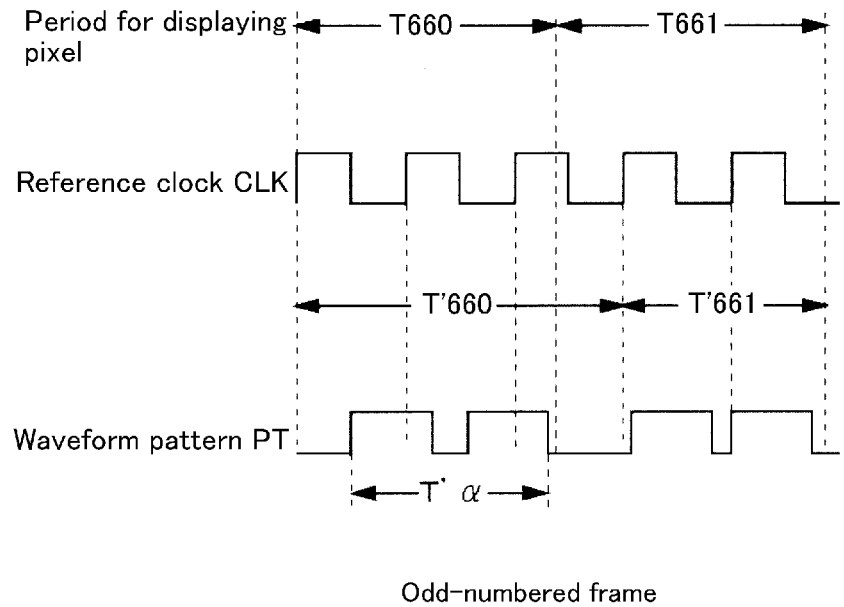
FIG. 13B is a timing chart showing a waveform pattern that can be switched in frame units.

The third technique for improvement relates to the inconsistency due to the switching between a number of types of waveform patterns PT in a predetermined period. As shown in FIG. 13(*a*), two waveform patterns PT where the location of the on period is different are prepared during a certain pixel displaying period T660, for example, and they are alternately used in even numbered frames (FIG. 13(*a*)) and odd numbered frames (FIG. 13(*b*)). As a result, as shown in FIG. 14, a laser spot in an even numbered frame (FIG. 14(*b*)) and a laser spot in an odd numbered frame (FIG. 14(*d*)) are integrated timewise so that a combined spot (FIG. 14(*d*)) of which the form is close to that of the ideal spot (FIG. 14(*a*)) is formed. As a result, it is possible to form pixels in a more ideal form and location, and at the same time, the effect to reduce speckle noise by averaging the pattern can be expected. Here, a typical technique for this is (4) to input whether the number of the frame is even or odd.

As described above, in the present embodiment, the laser sources are relaxation oscillated using a number of types of waveform patterns PT1 and PT2 that include an on period and an off period. At this time, the on period of the pixel P0 or P1023 where the pixel displaying period T1 is set longer in order to compensate for the difference in the scanning speed is segmented more than that of the pixel P512 where the pixel displaying period T1 is set shorter, and thus, more relaxation oscillations are generated. Therefore, the time ratio of the relaxation oscillations can be prevented from lowering due to the pixel displaying period being longer. As a result, speckle noise can be effectively reduced not only in the region of the pixel P512 (Vh=Vhigh) where the pixel displaying period is short, but also in the regions of pixels P0 and P1023 (Vh=Vlow) where the pixel displaying period is long. In addition, the on duty in the waveform pattern PT1, which is the time ratio of the on period accounting for the waveform pattern PT1, can be made smaller than that in the waveform pattern PT2 so that the brightness of the pixels P0 and P1023, where the time integral of the output intensity of the laser beam tends to be large due to the scanning speed being slow, can be suppressed. Thus, the system can be operated so that the time integral of the output intensity of the laser beams is made uniform so that it is possible to resolve the inconsistency in the brightness of the image.

INDUSTRIAL APPLICABILITY

As described above, the present invention can be applied to an image display device for displaying an image on a projection surface through the scanning of a laser beam of which the scanning speed fluctuates.

EXPLANATION OF SYMBOLS 1 laser projector
2*a* to 2*c* laser sources
3, 4 dye clock mirror
5 lens
6 scanning mirror
6*a* substrate
6*b* mirror
6*c*, 6*e* rotational axis
6*d*, 6*f* frame
6*g*, 6*h* coil
6*i* pair of electrodes
6*j* one pair of permanent magnets
6*k* the other pair of permanent magnets
7 scanning mirror driver
8 scanning mirror control unit
9 video processing unit
10 laser control unit
10*a* drive mode determining circuit
10*b* driving current selecting circuit
10*c* waveform pattern selecting circuit
11 laser driver

The invention claimed is:

1. An image display device, comprising:
   a laser source for emitting a laser beam;
   a scanning unit for scanning the laser beam emitted from the laser source; and
   a laser control unit for outputting a first control signal during a first period for displaying a first pixel in an image projected onto a projection surface by scanning the laser beam, and for outputting a second control signal during a second period for displaying a second pixel in the image, and the second control signal has more number of times of switching on and off of the laser source than the first control signal; wherein:
   a time location of an on period in each of the control signals is different in even numbered frames of the image and odd numbered frames of the image.

2. The image display device according to claim 1, wherein:
   the second period is scanned at slower scanning speed than the first period.

3. The image display device according to claim 1, wherein:
   two waveform patterns where the time location of the on period in each of the control signals are prepared, and alternately used in even numbered frames of the image and odd numbered frames of the image.

4. The image display device according to claim 1, wherein:
   the time location of the on period in even numbered frames of the image and the time location of the on period in odd numbered frames of the image are set so as to partially overlap.

5. The image display device according to claim 1, wherein:
   total time of the on period in the period for displaying the same pixel is approximately the same in even numbered frames of the image and odd numbered frames of the image.

6. The image display device according to claim 1, wherein:

the laser control unit outputs the first control signal and the second control signal on the basis of a reference clock that is out of sync with the period for displaying the first pixel and the period for displaying the second pixel, the on period in each of the control signals is set within a period during which the period for displaying the corresponding pixel and the period for displaying a pixel defined by the reference clock overlap.

7. The image display device according to claim 1, wherein:

the laser source emits the laser beam at a current level corresponding to the display gradation of the corresponding pixel during the on period in each of the control signals, and allows a current level to be set to the level at its own bias current or lower irrelevant of the display gradations during the off period in each of control signals.

8. The image display device according to claim 1, wherein:

the scanning unit is a scanning mirror from which a laser beam emitted from the laser source is reflected in accordance with its shifting angle so as to be projected onto the projection surface.

9. The image display device according to claim 1, wherein:

the first pixel is a pixel located in center region of the image, and the second pixel is a pixel located in both sides region of the image.

10. The image display device according to claim 2, wherein:

two waveform patterns where the time location of the on period in each of the control signals are prepared, and alternately used in even numbered frames of the image and odd numbered frames of the image.

11. The image display device according to claim 2, wherein:

the time location of the on period in even numbered frames of the image and the time location of the on period in odd numbered frames of the image are set so as to partially overlap.

12. The image display device according to claim 2, wherein:

total time of the on period in the period for displaying the same pixel is approximately the same in even numbered frames of the image and odd numbered frames of the image.

13. The image display device according to claim 2, wherein:

the laser control unit outputs the first control signal and the second control signal on the basis of a reference clock that is out of sync with the period for displaying the first pixel and the period for displaying the second pixel, the on period in each of the control signals is set within a period during which the period for displaying the corresponding pixel and the period for displaying a pixel defined by the reference clock overlap.

14. The image display device according to claim 2, wherein:

the laser source emits the laser beam at a current level corresponding to the display gradation of the corresponding pixel during the on period in each of the control signals, and allows a current level to be set to the level at its own bias current or lower irrelevant of the display gradations during the off period in each of control signals.

15. The image display device according to claim 2, wherein:

the scanning unit is a scanning mirror from which a laser beam emitted from the laser source is reflected in accordance with its shifting angle so as to be projected onto the projection surface.

16. The image display device according to claim 2, wherein:

the first pixel is a pixel located in center region of the image, and the second pixel is a pixel located in both sides region of the image.

17. The image display device according to claim 3, wherein:

the time location of the on period in even numbered frames of the image and the time location of the on period in odd numbered frames of the image are set so as to partially overlap.

18. The image display device according to claim 3, wherein:

total time of the on period in the period for displaying the same pixel is approximately the same in even numbered frames of the image and odd numbered frames of the image.

19. The image display device according to claim 10, wherein:

the time location of the on period in even numbered frames of the image and the time location of the on period in odd numbered frames of the image are set so as to partially overlap.

20. The image display device according to claim 10, wherein:

total time of the on period in the period for displaying the same pixel is approximately the same in even numbered frames of the image and odd numbered frames of the image.

* * * * *